(12) United States Patent
Lemont et al.

(10) Patent No.: US 9,376,334 B2
(45) Date of Patent: Jun. 28, 2016

(54) METHOD AND DEVICE FOR TREATING WASTES BY MEANS OF INJECTION INTO AN IMMERSED PLASMA

(75) Inventors: Florent Lemont, Villeneuve les Avignon (FR); Christophe Lafon, Saint Marcel d'Ardeche (FR); Jean-Marie Baronnet, Limoges (FR); Nicolas Boudesocque, Belval sous Chatillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1065 days.

(21) Appl. No.: 13/511,211

(22) PCT Filed: Nov. 29, 2010

(86) PCT No.: PCT/EP2010/068404
§ 371 (c)(1),
(2), (4) Date: Aug. 6, 2012

(87) PCT Pub. No.: WO2011/064361
PCT Pub. Date: Jun. 3, 2011

(65) Prior Publication Data
US 2013/0126445 A1 May 23, 2013

(30) Foreign Application Priority Data
Nov. 30, 2009 (FR) ..................................... 09 58480

(51) Int. Cl.
*C02F 1/66* (2006.01)
*F23G 5/08* (2006.01)

(52) U.S. Cl.
CPC . *C02F 1/66* (2013.01); *F23G 5/085* (2013.01); *F23G 2204/201* (2013.01)

(58) Field of Classification Search
CPC ..... C02F 1/66; F23G 5/085; F23G 2204/201; F23G 5/02; F23G 5/14; F23G 2209/18; F23G 2209/142; H05H 1/30; Y02E 20/322; Y02E 20/344; F23L 7/007
See application file for complete search history.

(56) References Cited

U.S. PATENT DOCUMENTS

| 3,051,639 A | 9/1958 | Anderson |
| 5,206,879 A | 4/1993 | Moody et al. |

(Continued)

FOREIGN PATENT DOCUMENTS

| CN | 1618260 A | 2/2007 |
| EP | 0469737 A2 | 2/1992 |

(Continued)

OTHER PUBLICATIONS

International Preliminary Report on Patentability issued on Mar. 6, 2012 for International Application No. PCT/EP2010/068404.

(Continued)

*Primary Examiner* — Walter D Griffin
*Assistant Examiner* — Cameron J Allen
(74) *Attorney, Agent, or Firm* — Knobbe, Martens, Olson & Bear, LLP

(57) ABSTRACT

A method for treating a liquid solution $S_1$ is provided. The method may comprise a step of injecting said liquid solution $S_1$ into a plasma immersed in a second liquid solution $S_2$ separate from said liquid solution $S_1$. In addition, a device capable of being applied in the context of such a method is also provided.

12 Claims, 1 Drawing Sheet

(56) References Cited

U.S. PATENT DOCUMENTS

| | | | |
|---|---|---|---|
| 6,187,206 | B1 | 2/2001 | Bernier et al. |
| 6,763,772 | B2 * | 7/2004 | Gnedenko ............... F23G 5/008 110/238 |
| 2005/0078309 | A1 | 4/2005 | Hammer |
| 2009/0118561 | A1 | 5/2009 | Vera |

FOREIGN PATENT DOCUMENTS

| | | |
|---|---|---|
| GB | 2 152 949 A | 8/1985 |
| JP | 2001170479 A2 | 6/2001 |
| WO | 95/04004 A1 | 2/1995 |
| WO | 97/22556 A1 | 6/1997 |
| WO | 01/92784 A1 | 12/2001 |
| WO | 2004/087840 A1 | 10/2004 |

OTHER PUBLICATIONS

International Search Report and Written Opinion issued on Mar. 1, 2011 for International Application No. PCT/EP2010/068404.

Alekseev, et al., "Thermal-Plasma Jet Oxidation of Phenol in Aqueous Solutions", High Energy Chemistry, 2000, vol. 34, No. 6, pp. 389-393.

Fortin, et al., "The Use of Thermal Plasma for Wastewater Treatment", 14th International Symposium on Plasma Chemistry—ISPC' 14, 1999, Prague (Czech Republic), pp. 2387-2392.

Preliminary Report dated Sep. 20, 2010 for French Application No. FR 0958480.

* cited by examiner

METHOD AND DEVICE FOR TREATING WASTES BY MEANS OF INJECTION INTO AN IMMERSED PLASMA

RELATED APPLICATIONS

This application is a U.S. National Phase of International Application No. PCT/EP2010/068404, filed Nov. 29, 2010, designating the U.S., and published in French as WO 2011/064361 on Jun. 3, 2011 which claims the benefit of French Patent Application No. 09 58480 filed Nov. 30, 2009.

TECHNICAL FIELD

The present invention relates to the field of treating wastes such as advantageously liquid chemical wastes.

More particularly, the present invention proposes a method for treating chemical wastes based on the destruction of these wastes by directly introducing them into a plasma immersed in a reactor filled with a liquid such as water.

The present invention also relates to a device which may be applied within the scope of this method.

BACKGROUND

Treatment of liquid wastes of any kinds such as dangerous and/or radioactive organic liquids is accomplished today with thermal processes applying reactors of the oven type which may be of different natures such as static ovens or rotary ovens, heated with different means.

Thus, methods for treating wastes apply thermal units connected to gas treatment systems relatively sizeable for ensuring cooling, filtration and neutralization of certain elements such as chlorine. This is generally expressed by units of large size subjected to high temperatures. The presence of certain elements such as chlorine, phosphorus, sulfur, . . . subjected to high temperatures intensifies the corrosive properties of the gases, which forces the designers either to select super-alloys which are often very expensive, or to accept frequent replacement of certain portions of the process.

The applied reactors may be of different types. These may be ovens heated by the Joule effect, by plasma torches or by the combustion of gas fuels like propane. The treatment temperature may thus vary depending on the nature of the load. If, for example, these are hydrocarbons of the dodecane type, this load may develop a thermal power of about 10 kW per L/h, a power which has to be dissipated. If, on the other hand, this is an aqueous solution, the power of the plasma will be partly used for ensuring its vaporization. The temperature behavior of the reactor involved in the process is therefore substantially impacted by the nature of the liquid to be treated.

According to the method, the introduction of the liquids may vary. They are either introduced into the core of the hot area of the oven, or they are introduced into the power source. For example, they may be vaporized in the combustible gas or directly introduced into a plasma. They may be treated alone or as a mixture with solids depending on the case. As an example, patent application EP 469 737 proposes a method and a device for treating liquids in an air plasma [1]. In this example, the plasma burns in a reactor in a refractory material and the liquids are introduced into the gas flow generating the plasma. Such a method requires a relatively burdensome device since the produced gases have to be treated notably via washing columns.

Further, regardless of the applied method, it appears that the nature of the liquids may substantially vary for reasons of thermal releases but also for reasons of compatibility with the materials selected for making the reactor.

Several solutions to the problem of the treatment of waste involving the use of immersed plasmas have already been proposed. For example, mention may be made of the publication of N. V. Alekseev et al. relating to a treatment method in which a plasma bursts out into a container containing an aqueous solution polluted by a few tens of milligrams of phenol per liter of water [2]. In this case, the plasma is used for producing hydrogen peroxide which oxidizes the dissolved organic compounds. The publication of G. Fortin et al. also mentions a method applying an argon/nitrogen plasma torch burning at the bottom of a reactor filled with leachates loaded with cyanides [3]. An international application was moreover filed by the same authors for protecting the invention [4].

In all cases, these methods were developed for treating aqueous solutions containing small amounts of products to be removed: a few ppm of phenol in the first case, a few ppm of cyanides in the second. The products are gradually degraded by the plasma torch operating at the heart of the solution, a torch which produces chemical radicals required for oxidation of the organic compounds.

Therefore, there exists an actual need for a method for treating notably liquid chemical wastes, improved in terms of rapidity and efficiency, which may treat liquids and this, regardless of their nature and/or their composition, using a simpler, more compact and less expensive device in its achievement and/or in its use.

DESCRIPTION OF CERTAIN INVENTIVE ASPECTS

With the present invention, it is possible to find a remedy to the technical drawbacks and problems listed above. Indeed, the latter proposes a method and a device for treating wastes, notably liquid wastes, based on direct injection of the wastes into the core of a burning plasma, immersed in a solution separate from the solution containing the wastes. As a reminder, in the methods of the prior art using an immersed plasma, the latter is established in the core of the solutions to be treated.

The work of the inventors was able to show that direct injection of the wastes into the plasma allows their total and instantaneous destruction while past experiments show that several tens of minutes [3] or even several hours are required for disappearance of the compounds to be removed [2].

When the plasma torch applied within the scope of the present invention operates with oxygen, the ionized plume obtained is extremely reactive. Oxidation is therefore accomplished directly at its level and not via active radicals specifically produced for this purpose.

Further, the method of the present invention may operate continuously by circulating the solution of the reactor in a loop ensuring both cooling, neutralization and filtration.

More particularly, the present invention relates to a method for treating a liquid solution designated hereafter as solution $S_1$ comprising a step for injecting said solution $S_1$ into an immersed plasma in a second liquid solution designated hereafter as solution $S_2$ separate from said solution $S_1$.

By <<treatment of a solution $S_1$>>, is meant within the scope of the present invention, the reduction in the amount of toxic and/or harmful organic components and stabilization of those which may be corrosive and/or radioactive, these components being present in the solution $S_1$ before the treatment according to the invention. This reduction may involve the removal of these components and/or their transformation into less harmful components.

The toxic, harmful, corrosive and/or radioactive organic components which may be present in the solution $S_1$ may comprise heavy metals; radioactive elements and organic elements. As non-limiting examples, these components are selected from the group consisting of chlorine, fluorine, sulfur, zinc, phosphorus, mercury, lead, cadmium, arsenic, phenol, cyanides, ferrocyanides, oxalates, humic acids, strontium, ruthenium, cesium, alpha emitters, such as americium, plutonium, and uranium and mixtures thereof. Advantageously, at least 70%, at least 80%, at least 90%, at least 95%, at least 96%, at least 97%, at least 98%, at least 99% or even the totality of the chemical components initially contained in the solution $S_1$ are removed and/or transformed into less harmful components following the treatment of the invention.

The solution $S_1$ applied within the scope of the present invention may be any liquid advantageously organic solution, which may contain at least one toxic, harmful, corrosive and/or radioactive organic component as defined earlier. The solution $S_1$ may appear as a pure or mixed organic liquid, a radioactive liquid, an emulsion, a micro-emulsion, an aqueous solution, a suspension of notably organic compounds in an aqueous solution, a liquid containing particles stemming from the spraying of a solid or a dangerous liquid waste.

More particularly, solution $S_1$ may be any type of solution containing organic materials either bound or not to minerals. Such a solution may stem from civil applications, either nuclear or not, or from all military applications, either nuclear or not. As non-limiting examples, the solution $S_1$ may be selected from the group consisting of a solution stemming from waste water purification plants or from sludges of waste water purification plants, from waste water, from waste oils, from domestic liquid effluents, from medical or hospital liquid effluents, from industrial liquid effluents and from liquid effluents from nuclear plants. In the present invention, the expressions <<solution $S_1$>>, <<liquid solution $S_1$>>, <<liquid to be treated>> or <<solution to be treated>> are equivalent and may be used interchangeably.

The method according to the present invention applies a plasma. As a reminder, a plasma is a gas in the ionized state, conventionally considered as a fourth state of matter. In order to obtain ionization of a gas at atmospheric pressure, plasma torches are used.

Advantageously, the plasma applied within the scope of the present invention is an arc plasma. More particularly, the plasma applied within the scope of the present invention is a blown arc plasma.

The solution $S_2$ applied within the scope of the present invention is the solution in which the plasma used in the method is immersed.

First of all, the solution $S_2$ in which the plasma is immersed ensures cooling of the device (i.e. of the reactor) without necessarily requiring additional elements for cooling the walls of the reactor. This solution $S_2$ also has a role in the treatment of the emitted gases since it ensures quenching, removal of dust and neutralization of the produced gases and condensation of the volatile products. The solution $S_2$ therefore acts as a cooler, a filter and a washing column.

The solution $S_2$ is an aqueous or saline solution and advantageously water. The solution $S_2$ may further contain at least one additive ensuring destruction of residual organic materials. Such an additive is a catalyst ensuring extensive degradation of residual organic materials. These catalysts may, for example, activate Fenton reactions activated by the plasma radiation. These may be Fenton reagents ensuring production of radicals under plasma radiation. Further, the pH of the solution $S_2$ may be maintained to a value close to neutrality. In the present invention, the expressions <<solution $S_2$>>, <<liquid solution $S_2$>> and <<solution of the reactor>> are equivalent and may be used interchangeably.

The solution $S_2$ is not only separate from the solution $S_1$ but also does not correspond to a liquid solution from the treatment of notably liquid wastes such as a solution $S_1$ or resulting from such a treatment, such as for example a solution containing partly treated wastes which may stem from a preliminary treatment of liquid wastes, a molten bath from treatment of the wastes, a metal layer of such a molten bath or a layer of slags from such a molten bath. The definition of the solution $S_2$ above is obviously understood at the moment when the latter is applied i.e. at the moment when the plasma is immersed therein and before injecting the solution $S_1$.

The method according to the present invention advantageously comprises the successive steps of:
a) generating a plasma as defined earlier;
b) immersing the plasma generated in step (a) in a solution $S_2$ as defined earlier;
c) introducing the solution $S_1$ as defined earlier in the thereby immersed plasma.

The steps (a), (b) and (c) are performed successively.

Step (a) of the method according to the invention consists of generating a plasma and notably a blown arc plasma from a plasma torch. Advantageously, an electric discharge is produced at the plasma torch consisting of electrodes while a plasma gas passes between these electrodes, which generates the plasma.

The plasma gas which may be used may be any gas known to one skilled in the art. It may vary according to the plasma torch technology used. Within the scope of the present invention, the plasma gas includes an oxidizing gas required for the reactivity of the plasma and/or a neutral gas required for protecting the cathode of the torch.

In a first alternative, the plasma gas only includes an oxidizing gas. This alternative uses a torch which does not require any neutral protective gas. The oxidizing gas may thus be selected from the group consisting of oxygen, air, carbon dioxide and mixtures thereof. The oxidizing gas is advantageously oxygen.

In a second alternative, the plasma gas includes an oxidizing gas as defined earlier and a neutral gas. The neutral gas is notably selected from the group consisting of argon, helium, nitrogen and mixtures thereof. Advantageously, the plasma obtained is selected from the group consisting of an argon/oxygen plasma, a helium/oxygen plasma, and a nitrogen/oxygen plasma.

In a third alternative, notably corresponding to the case when non-oxidizing gasification is sought during step (c) of the method, the plasma only operates with the neutral gas as defined earlier, and notably with argon and does not require addition of oxygen. If oxidation is required for destroying the organic components contained in the solution $S_1$, an oxygen flow may then be added in order to produce a neutral gas/oxygen plasma.

In a fourth alternative, the plasma gas is a drainage gas recycled towards the plasma torch. Such a gas advantageously includes the compounds: $CO_2/O_2$/argon. In this alternative, technologies of torches commonly using anodes and cathodes in cooled copper may be contemplated. Other metals such as tungsten may be contemplated according to the selected modes of operation. Thus, in this fourth alternative, the applied plasma recycles all or part of the gases emitted by the process as a plasma gas.

Step (b) of the method according to the present invention consists of filling the reactor in which the plasma has been generated during step (a) with the solution $S_2$. During the filling of the reactor, the latter is not completely filled with the solution $S_2$.

The solution $S_2$, during step (b), has a temperature comprised between 20 and 60° C. and, notably at a controlled temperature around 30° C.±5° C. Therefore, the relatively high temperature of the reactor following step (a) is lowered, advantageously down to the temperature of the solution ($S_2$). It is therefore possible in the present invention to refer to this as a <<cold reactor>>.

As soon as the plasma is initiated, the reactor has to be rapidly filled in order to avoid heating of the system.

Step (c) of the method according to the present invention consists of putting the solution $S_1$ into contact with the core of the plasma so that the treatment as defined earlier occurs instantaneously.

Thus, the solution $S_1$ may be introduced or injected into the plasma and notably into the core of the plasma via channels laid out in the plasma torch.

Alternatively, the solution $S_1$ may be introduced or injected into the plasma and notably into the core of the plasma via an external device brought as close as possible to the plasma.

Regardless of the applied alternative, the introduction rate of the solution $S_1$ will depend on the power of the plasma used and on the nature of the solution $S_1$. Depending on the case, it may attain several tens of liters per hour.

Introduction of the solution $S_1$ during step (c) may be accomplished continuously or sequentially by an alternation of moments with and without introduction of solution.

Step (c) of the method according to the present invention may last from a few minutes to several hours or even several days. Thus, step (c) of the method according to the present invention may be carried out 24 hours a day for durations consistent with the lifetime of the plasma torch.

As explained earlier, the reaction for gasification, combustion and/or oxidation of the components of the solution $S_1$ occurs instantaneously in the plasma as soon as the solution $S_1$ is put into contact with the latter.

During step (c) of the method according to the present invention, the dissociated gases once out of the plasma have to be rapidly neutralized and notably quenched in order to avoid formation of toxic complex molecules such as furanes or dioxins. It is the solution $S_2$ which ensures these functions. Also, the dust and volatile compounds from the gasification, combustion and/or oxidation reaction are respectively removed and condensed by means of the solution $S_2$.

The method according to the present invention comprises an additional step consisting of filtering, cooling and/or neutralizing said solution $S_2$. It should be emphasized that the operation of the plasma torch and the reactions intervening during step (c) of the method according to the present invention may cause heating of the solution $S_2$ located in the reactor.

Also, in order to reduce the saturating vapor pressure, the method according to the present invention may comprise an additional step consisting of cooling the solution $S_2$. This additional step may occur during or after step (c) of the method. Advantageously, the cooling of the solution $S_2$ is applied simultaneously in step (c) of the method.

Any system capable of decreasing the temperature of a liquid may be used for this cooling step. Advantageously, this step applies a parallel treatment loop involving an exchanger or an air cooler.

A filter ensuring blocking of the mineral particles stemming from the treatment and from the destruction of the solution $S_1$ is advantageously placed on the loop, upstream from the exchanger used for cooling the solution $S_2$.

Finally, when the treatment method according to the present invention is completed, the reactor is purged of the solution $S_2$ thereby letting the plasma emerge for a short duration, a duration required for ensuring the drying of the parts surmounting the torch in order to avoid penetration of the solution $S_2$ into its nozzle. This immersion time produces normal heating of the reactor. The duration for which the plasma is emergent should be short but sufficient for ensuring drying of the parts surmounting the torch. It may be comprised between 10 s and 5 mins.

Once the torch is extinguished, the supply of plasma gas (es) has to be maintained in order to ensure total drying of the torch. This supply may be maintained for a duration of more than 10 mins.

The present invention also relates to a device which may be applied within the scope of the method according to the present invention. This device comprises
  a reactor;
  a plasma torch and notably a blown arc plasma torch;
  first means capable of bringing the solution $S_2$ as defined earlier into said reactor;
  second means capable of introducing (or injecting) the solution $S_1$ as defined earlier into the plasma generated from said plasma torch, the second means being different from the aforementioned first means; and
  means capable of supplying the plasma torch with at least one plasma gas as defined earlier.

The reactor of the device according to the invention may be of any shape and of any volume. As explained earlier, the solution $S_2$ ensures cooling of the reactor, the latter therefore does not necessarily need to be made in a material capable of withstanding very high temperatures since it is cold. Advantageously, it is in stainless steel.

Any plasma torch and notably any blown arc plasma torch may be used within the scope of the present invention. The power and the intensity of the plasma torch applied within the scope of the present invention will be selected depending on the solution $S_1$ to be treated and on the flow rate to be injected. Further, the device according to the present invention further comprises means capable of applying an electric current or a potential given to the plasma torch and more particularly to the electrodes forming said plasma torch.

The means capable of bringing the solution $S_2$ into the reactor, capable of introducing (or injecting) the solution $S_1$ into the generated plasma and capable of supplying the plasma torch with a plasma gas and optionally a secondary gas, may be any means with which a liquid or gas fluid may be brought into a compartment. Among these means, mention may be made of liquid supply pumps, gas supply pumps and means for supplying a liquid by hydrostatic pressure.

These means are connected to the reactor and/or to the plasma torch through piping in a flexible material or in a rigid material.

The means capable of introducing (or injecting) the solution $S_1$ into the generated plasma from said plasma torch may involve channels laid out in a part placed at the end of the plasma torch.

This part which forms an additional component of the reactor and which is attached to the latter by any suitable means is advantageously located in the extension of the anode of the plasma torch in order to form an additional combustion area having the shape of a sheath or a nozzle. The walls of this part may be in metal cooled by internal circulation of water. The metal will be selected to be stainless. With this part it is possible to extend the dwelling time of the gases and to protect the combustion from a too rapid quenching in the solution $S_2$. Advantageously, the channels capable of introducing (or injecting) the solution $S_1$ into the plasma which this part has, may also be capable of bringing oxidizing gas. Alternatively, this part may have two distinct types of channels, one of which being capable of conveying oxidizing gas and the other of introducing the solution $S_1$.

Another alternative relating to the means capable of introducing (or injecting) the solution $S_1$ into the plasma generated from said plasma torch, may apply an external device brought as close as possible to the plasma. This may be a nozzle projecting a jet of solution $S_1$ into the inside of the plasma.

Finally, the means capable of supplying the plasma torch with at least one plasma gas and optionally with at least one secondary gas may involve channels opening out between the anode and the cathode of the plasma torch and/or channels laid out in the anode and/or the cathode.

When the device according to the present invention operates, the gases generated following gasification, combustion and/or oxidation, bubble in the solution $S_2$ where they are quenched and purified of their dusts and neutralizable chemical species such as $HCl$, $SO_2$, $SO_3$, $NO_2$, $NO_3$ and $P_2O_5$. Before being discharged outside the device and notably into the outer medium, they advantageously pass into a condenser and then optionally into a filter.

Thus, the device according to the present invention may comprise a condenser and optionally an air filter. Advantageously, the condenser and optionally the filter are mounted in the upper portion of the reactor.

The condenser which also has a role of a droplet catcher which may be used within the scope of the present invention is advantageously a condenser with a separate fluid in which a fluid distinct from the combustion gases and notably a coolant fluid from a cooling device is maintained at a temperature below that of the gas(es) entering the combustion chamber. The condenser which may be used within the scope of the present invention may be a condenser of the tubular heat exchanger or evaporator type.

Any type of air filter may be used at the outlet of the condenser within the scope of the present invention. However, in order to ensure high efficiency filtration, a filter of the active coal filter type, of the glass microfiber filter type, or of the polytetrafluoroethylene filter type may be used. As examples, mention may be made of a panel filter Megalam® or an air filter Micretain®.

The operation of the plasma torch as well as gasification, combustion and/or oxidation of the components of the solution $S_1$, cause heating of the solution $S_2$. Therefore, in order to reduce the saturation vapor pressure, the device according to the present invention may comprise a system capable of ensuring cooling of the solution $S_2$. Further, the device according to the present invention may further comprise a system capable of ensuring filtration of the solution $S_2$.

Thus, the device according to the present invention advantageously comprises an exchanger provided upstream with a filter. The exchanger which may be used within the scope of the present invention is a heat exchanger of the dual flow type in which the solution $S_2$ exchanges heat with another liquid or gas flow so as to maintain the temperature of the solution $S_2$ at a level limiting the vapor pressure at the surface of the reactor. This heat exchanger may be an exchanger with a U-shaped tube, an exchanger with a horizontal or vertical tubular manifold, a spiral exchanger or a plate exchanger.

A filter is advantageously placed upstream from the exchanger in order to recover the dusts from the combustion and any solid from the precipitation of the minerals present in the solution $S_1$.

The filter applied within the scope of the device of the invention comprises at least one membrane advantageously of the nanofiltration, microfiltration or ultrafiltration type. These membranes are defined by smaller pore sizes than the average particle size of the dust and solids, conventionally of the order of one micrometer up to tens of nanometers.

During the treatment, the solution $S_2$ may become acid or basic depending on the case. Also, the device according to the present invention may further comprise means capable of monitoring and adjusting the pH of the solution $S_2$.

These means may comprise an electrode for measuring the pH placed in the reactor or in a circuit exterior to the reactor but connected to the latter. The measurement of the pH may be carried out continuously or intermittently. The electrode for measuring the pH is either directly or indirectly connected to means capable of adding an acid or a base to the solution $S_2$.

To summarize, the advantages of the present invention are multiple and originate from the capability of the device and notably of the reactor of simultaneously ensuring several unit operations which are:
  destruction of the solution to be treated i.e. the solution $S_1$ injected into the core of a plasma burning in a solution separate from the solution to be treated i.e. the solution $S_2$,
  quasi-instantaneous quenching of the gases in the solution $S_2$,
  quasi-instantaneous condensation of the volatile materials,
  removal of dust from the gases by a washing effect,
  neutralization of the gases during bubbling.

This accumulation of functions ensures very substantial simplification of the system for treating gases since:
  the cooling system is no longer mandatory;
  the presence of condensable compounds in the gases is suppressed like the solids and precipitates which have been retained in the solution $S_2$. The filtration may therefore be limited to a filter of very high efficiency in the case when the waste discharge standards are carried to an extreme;
  the systems for washing gases are no longer necessary.

An extremely simplified and compact system results therefrom, in which subsists a reactor followed by a condenser. An exchanger, preceded with a filter is added in parallel to the reactor in order to ensure that the temperature of the treatment solution, i.e. the solution $S_2$, is maintained.

A last advantage consists in maintaining the system at a low temperature, which allows perfect control of the corrosion and limitation of the costs related to a vast selection of materials for the reactor which are financially more affordable. The reactor may for example be built in stainless steel with a cooled double wall.

The non-mandatory cooling during the treatment process ensures in this case a safety function during the starting and stopping phases but also in the case of an accidental purge of the reactor. The substances which may be deposited, directly pass into the solution $S_2$ and are trapped in the filter put in series with the exchanger.

Other features and advantages of the present invention will further become apparent to one skilled in the art upon reading the examples hereafter given as an illustration and not as a limitation, with reference to the appended figures.

DETAILED DISCUSSION OF CERTAIN ILLUSTRATIVE EMBODIMENTS

I. Device

Figure 1:
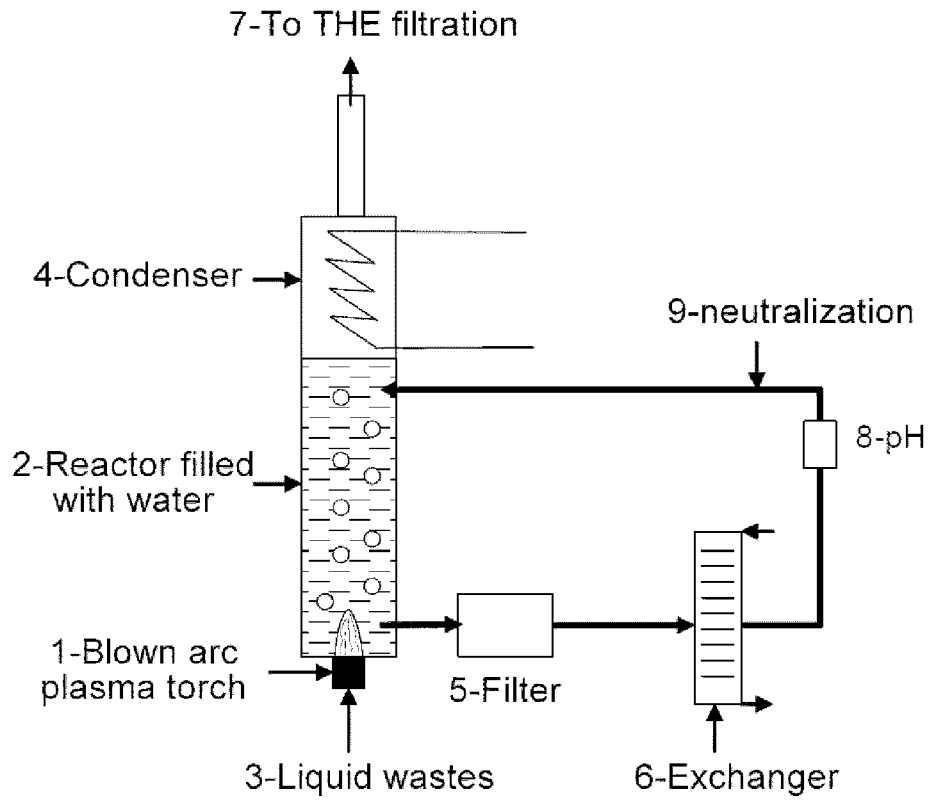
FIG. 1 is a general and schematic view of a device for treating liquid wastes according to the present invention.

FIG. 1 illustrates the description provided below. The present invention is based on the use a blown arc plasma (1) immersed in a reactor of cylindrical shape and with a volume of 50 L, filled with water (2). The liquid product to be treated (3) such as a mixture of a phosphorus-containing hydrocarbon is introduced into the plasma by a channel system laid out in the torch which operates with oxygen. Once in the plasma, the liquid is instantaneously brought to a very high temperature of the order of 2,000° C. in the presence of oxygen, which has the consequence of total destruction of the organic materials.

Figure 2:
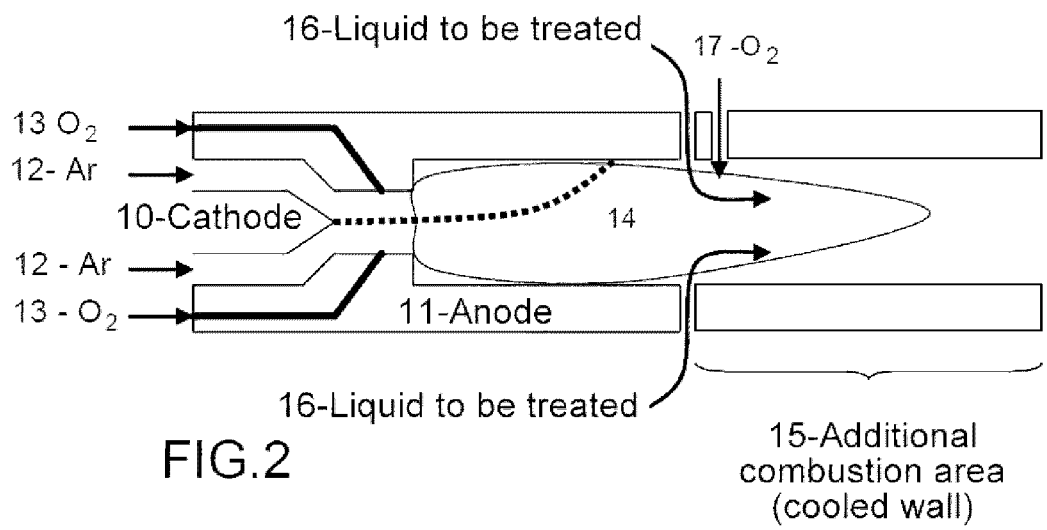
FIG. 2 is a more detailed view of a blown arc plasma torch which may be used in a device for treating liquid wastes according to the present invention.

FIG. 2 illustrates the plasma torch used. This is a conventional plasma torch in which a refractory cathode (10) in tungsten, of conical shape, protected by a stream of argon (12) generates an electric arc towards an anode (11). The anode (11) appears in the form of a sheath with a length of 10 cm and a diameter of 10 mm. This arc is blown by a flow of argon (12) and of oxygen (13). In the case when non-oxidizing gasification is sought (for example in order to ensure production of a synthesis gas of the $CO/H_2$ type), the plasma only operates with argon and does not require addition of oxygen. If oxidation is required for destroying organic components, then an oxygen flow (13) is added in order to produce an argon/oxygen plasma (14). The liquid to be treated is injected at a rate of 1 L/h via channels (16) laid out in a part placed at the tip of the plasma torch. This part may include an additional combustion area (15) optionally supplied with an addition of oxygen (17) in order to ensure complete combustion of the gases, a combustion which may be blocked by a too rapid quench in the solution of the reactor. This combustion area consists in a nozzle cooled by an internal circulation of water, the walls of which are in copper and the volume of which is of the order of 0.02 L.

The gases from the combustion bubble in the solution of the reactor in which they are instantaneously quenched. During bubbling, the gases are purified of their dusts and neutralizable chemical species such as HCl, $SO_2$, $SO_3$, $NO_2$, $NO_3$, and $P_2O_5$. They then pass through a condenser (4) which is also used as a droplet catcher and they are then discharged towards the outside.

Depending on the required purification level, the gases may undergo very high efficiency filtration (7) in order to prevent any exit of particles. This filter is optional. However, it may become necessary notably during the treatment of radioactive wastes.

The condenser (4) forms the upper portion of the reactor. It is provided with one or several cooling coils immersed in a packing ensuring proper mixing of the gases and coalescence of the water droplets.

The operation of the plasma torch as well as the combustion of the organic materials cause heating of the water located in the reactor. In order to reduce the saturation vapor pressure, the water is cooled in a loop through an exchanger (6). Its temperature is maintained at a level limiting the vapor pressure at the surface of the reactor. The cooling circuit is provided upstream from the exchanger (6) with a filter (5) ensuring recovery of the solids from the precipitation of the minerals present in the effluents to be treated. This filtration-cooling loop draws off the solution in the lower portion of the reactor and reintroduces it into its upper portion.

During the treatment, the solution of the reactor may become acid or basic depending on the case. Online monitoring of the pH (8) allows a continuous adjustment of this measurement by adding an acid or a base depending on the case (9).

II. Operation and Performances

The reactor is started under no load. Once the plasma torch is initiated, the reactor is filled with water, which causes an instantaneous drop of the temperature to room temperature. The phosphorus-containing hydrocarbon mixture is then introduced into the plasma, either through channels laid out in the plasma torch, or through an external device brought very close to the plasma. The treatment is accomplished continuously in the solution which is filtered and cooled in a parallel treatment loop.

At the end of the treatment, the reactor is purged of its solution thereby letting the plasma emerge for about one minute, the time required for ensuring drying of the parts surmounting the torch in order to avoid penetration of water into its nozzle. This immersion time produces normal heating of the reactor to about 100° C.

The tests carried out were conducted with a 45 kW torch delivering a stable intensity of 200 A over the whole duration of the experiments and a stable voltage close to 220 V.

The treatment of a phosphorus-containing hydrocarbon mixture at 1 L/h gave the possibility after analyzing the collected solution, of noting a destruction efficiency of 99.98% with phosphorus totally dissolved. In the mentioned case, the recovered solution is a solution of phosphoric acid which may easily be neutralized with a base ensuring precipitation of sodium phosphate.

The destruction efficiency of 99.98% may be improved by increasing the volume of the combustion nozzle in order to extend the dwelling time of the gases and by adding into the solution $S_2$, catalysts ensuring continuous degradation of the residual organic materials under the impact of the plasma radiation. Reactions of the Fenton type may be contemplated.

REFERENCES

[1] Patent application EP 469737 (Tioxide Group Services Limited) "Destruction process" published on Feb. 5, 1992.
[2] Alekseev N. V., Samokhin A. V., Belivtsev A. N. and Zhavoronkova V. I., (2000) "*Thermal-Plasma Jet Oxidation of Phenol in Aqueous Solutions*", High Energy Chemistry, Vol. 34, No. 6, pp. 389-393
[3] Fortin L., Soucy G., Kasireddy V., Bernier J.-L., Boulos M. I (1999) "*The Use of Thermal Plasma for Wastewater Treatment*", 14$^{th}$ International Symposium on Plasma Chemistry—ISPC'14, Prague (Czech Republic), pp. 2387-2392
[4] International application WO 97/22556 (Alcan International Limited) "Thermal Plasma Reactor and Wastewater Treatment Method" published on Jun. 26, 1997.

What is claimed is:

1. A method for treating a liquid solution designated as solution $S_1$ comprising injecting said solution $S_1$ into a core of a plasma immersed in a second liquid solution designated as solution $S_2$ separate from said solution $S_1$.

2. The method according to claim 1, wherein said solution $S_1$ is a solution containing organic materials either bound or not to minerals.

3. The method according to claim 1, wherein said plasma is a blown arc plasma.

4. The method according to claim 1, wherein said solution $S_2$ is an aqueous or saline solution.

5. The method according to claim 1, wherein said solution $S_2$ contains at least one additive ensuring destruction of the residual organic materials.

6. The method according to claim 1, wherein it comprises the successive steps of:
   a) generating a plasma as defined in claim 1;
   b) immersing the plasma generated in step (a) in a solution $S_2$ as defined in claim 1;
   c) introducing the solution $S_1$ as defined in claim 1 into the core of the thereby immersed plasma.

7. The method according to claim 1, wherein said plasma is selected from the group consisting of an argon plasma, a helium plasma, a nitrogen plasma and a plasma of one of their mixtures.

8. The method according to claim 1, wherein said plasma is selected from the group consisting of an argon/oxygen plasma, a helium/oxygen plasma and a nitrogen/oxygen plasma.

9. The method according to claim 1, wherein said plasma recycles all or part of the gases emitted by said method as a plasma gas.

10. The method according to claim 1, wherein said method comprises an additional step of filtering, cooling and/or neutralizing said solution $S_2$.

11. The method according to claim 1, wherein said solution $S_1$ is selected from the group consisting of a solution from waste water purification plants or from sludges of waste water purification plants, from waste waters, from waste oils, from domestic liquid effluents, from medical or hospital liquid effluents, from industrial liquid effluents and from liquid effluents from nuclear plants.

12. The method according to claim 1, wherein said solution $S_2$ is water.

* * * * *